United States Patent
Albert et al.

(10) Patent No.: US 10,315,255 B2
(45) Date of Patent: Jun. 11, 2019

(54) MACHINE TOOL WITH AN ASSEMBLY CONFIGURATION WITH A CANTILEVERED TOOL

(71) Applicant: AIRBUS SAS, Blagnac (FR)

(72) Inventors: Fabien Albert, La Baule (FR); Eric Pospisil, Burnaby (CA); Kyle Hollis, Mukilteo, WA (US); Jeff Nelson, Seattle, WA (US); Eric Davis, Bothell, WA (US)

(73) Assignee: AIRBUS SAS (FR)

( * ) Notice: Subject to any disclaimer, the term of this patent is extended or adjusted under 35 U.S.C. 154(b) by 0 days.

(21) Appl. No.: 15/840,084

(22) Filed: Dec. 13, 2017

(65) Prior Publication Data
US 2018/0169768 A1    Jun. 21, 2018

(30) Foreign Application Priority Data
Dec. 20, 2016    (FR) ...................... 16 62922

(51) Int. Cl.
*B23Q 9/00*    (2006.01)
*B23B 39/14*    (2006.01)
(Continued)

(52) U.S. Cl.
CPC .............. *B23B 39/14* (2013.01); *B23B 41/00* (2013.01); *B23B 49/00* (2013.01); *B23Q 3/088* (2013.01);
(Continued)

(58) Field of Classification Search
CPC ... B23B 39/14; B23B 2215/04; B25H 1/0064; B25H 1/0071; B23Q 9/0007; B23Q 9/0014; B23Q 9/0042; B23Q 9/02
See application file for complete search history.

(56) References Cited

U.S. PATENT DOCUMENTS

| | | | | |
|---|---|---|---|---|
| 5,848,859 A | * | 12/1998 | Clark | ...................... B23B 39/14 408/1 R |
| 2005/0265798 A1 | * | 12/2005 | Boyl-Davis | .......... B23Q 9/0014 408/76 |

(Continued)

FOREIGN PATENT DOCUMENTS

| | | | | |
|---|---|---|---|---|
| EP | 2674244 A1 | * | 12/2013 | ............. B23Q 1/012 |
| EP | 2 859 990 A1 | | 4/2015 | |

(Continued)

OTHER PUBLICATIONS

FR 16 62922 Search Report dated Sep. 1, 2017.

*Primary Examiner* — Daniel W Howell
(74) *Attorney, Agent, or Firm* — Lerner, David, Littenberg, Krumholz & Mentlik, LLP (57) ABSTRACT

A machine tool for carrying out operations on a part includes a longitudinal rail, a transverse arm, a module for connection between the transverse arm and the longitudinal rail, the module being fitted in translation on the longitudinal rail, a tool which is supported by the transverse arm, and a retention unit which is arranged at one end of the transverse arm, and includes at least one sucker. The machine tool has an assembly configuration—in which the retention unit and the tool are positioned respectively on both sides of the longitudinal rail, such that the tool is fitted cantilevered relative to the longitudinal rail. This provides the machine tool with great polyvalence, in that it makes it possible to carry out operations in areas which in particular have significant curvatures, which are difficult to access, or which are unsuitable for securing of the sucker(s) of the retention unit.

12 Claims, 5 Drawing Sheets

(51) Int. Cl.
*B23B 49/00* (2006.01)
*B23B 41/00* (2006.01)
*B23Q 3/08* (2006.01)
*B64F 5/10* (2017.01)
*B23Q 17/24* (2006.01)

(52) U.S. Cl.
CPC .............. *B23Q 9/0007* (2013.01); *B64F 5/10* (2017.01); *B23B 2215/04* (2013.01); *B23B 2270/483* (2013.01); *B23Q 9/0042* (2013.01); *B23Q 17/2409* (2013.01); *B23Q 2210/008* (2013.01)

(56) References Cited

U.S. PATENT DOCUMENTS

| | | | |
|---|---|---|---|
| 2008/0077276 A1* | 3/2008 | Montero Sanjuan | B21J 15/14 700/245 |
| 2010/0122444 A1* | 5/2010 | Reid | B21J 15/14 29/243.54 |
| 2012/0014759 A1* | 1/2012 | Sarh | B62D 57/024 408/76 |
| 2013/0039713 A1* | 2/2013 | Weidman | B23Q 1/01 409/235 |
| 2015/0096777 A1 | 4/2015 | Albert | |

FOREIGN PATENT DOCUMENTS

| | | | | |
|---|---|---|---|---|
| FR | 3011494 A1 | 4/2015 | | |
| WO | 2007/019228 A1 | 2/2007 | | |
| WO | 2010/019320 A1 | 2/2010 | | |
| WO | WO-2011157933 A1 * | 12/2011 | ........... | B23Q 1/5425 |

* cited by examiner

MACHINE TOOL WITH AN ASSEMBLY CONFIGURATION WITH A CANTILEVERED TOOL

TECHNICAL FIELD

The present invention relates to a machine tool for carrying out operations on the surface of a part, in particular a part with large dimensions, for example for carrying out drilling operations on an aircraft fuselage element.

More generally it concerns the field of machine tools which are used in order to carry out automated or semi-automated operations, typically operations of machining or assembly, on parts or structures with large dimensions.

TECHNOLOGICAL BACKGROUND

The production of aircraft fuselages or other aeronautical structures such as wings is carried out in a known manner by the assembly of rigid panels, which are generally made of metal, on a structure. For this purpose, the flat or curved panels are put into position on the structure and assembled on the latter for example by riveting. This makes it necessary to be able to machine the assembly once the panels are in position, typically in order to carry out the drilling operations necessary for the riveting.

These operations can be carried out by an operator. The development of robots with large dimensions which can carry out the drilling operations on all of a fuselage is costly.

In order to carry out these drilling operations or other simple machining operations on assemblies with large sizes, rapidly and with precision, devices have nevertheless been developed in order to automate these operations partly.

For example, a machine tool is known comprising two parallel flexible rails which are secured on the structure to be machined. The rails are secured on the structure by means of suckers. A machining means, typically a drill, is displaced between the two rails, along a transverse module.

However, a device of this type is complicated to implement, in that it comprises two rails which must be perfectly parallel. In addition, in terms of construction, the width between the two rails and the surface which can be reached by the machining tool are limited. Finally, a device of this type is not suitable for a surface which has a substantial double curvature, because of the difficulty in positioning two parallel rails on a surface of this type. A pronounced double curvature is present in certain areas of aeronautical structures, and in particular of certain fuselages.

Document FR3011494 describes a machine tool which makes it possible to carry out operations on a part, comprising a single rail, and a unit comprising means for retention on the part, as well as a transverse arm supporting a tool, the ends of which transverse arm are connected respectively to the rail and to the unit. A machine tool of this type is simple to implement, since it requires positioning of a single rail. It is suitable for carrying out operations on a part with a surface with double curvature. However, this machine tool is not suitable for particular configurations of parts, or for carrying out operations in certain areas in which the implementation of the unit comprising retention means is not possible.

SUMMARY OF THE INVENTION

The objective of the present invention is to propose an optimised machine tool which makes it possible to eliminate at least one of the aforementioned disadvantages.

For this purpose, the invention thus relates to a machine tool for carrying out operations on a part, comprising:
- a longitudinal rail which is configured to be positioned relative to the part;
- a transverse arm which is orthogonal to the longitudinal rail, the transverse arm comprising two ends;
- a module for connection between the transverse arm and the longitudinal rail, the said connection module being fitted in translation on the longitudinal rail;
- a tool which is supported by the transverse arm;
- at least one retention unit which is arranged at one end of the transverse arm, and comprises at least one sucker which permits retention in position of the retention unit on the part.

The transverse arm comprises means for securing on the connection module, positioned between the two ends of the transverse arm, such that the machine tool has an assembly configuration in which the retention unit and the tool are positioned respectively on both sides of the longitudinal rail, such that the tool is fitted cantilevered relative to the longitudinal rail.

The assembly configuration in which part of the transverse arm and the tool are cantilevered relative to the longitudinal rail provides the machine tool with great polyvalence, in that it makes it possible to carry out operations in areas which in particular have significant curvatures, which are difficult to access, or which are unsuitable for securing of the sucker(s) of the retention unit.

In a machine tool of this type, in the fitting position in which the tool is cantilevered, the cantilevered length of the transverse arm can correspond to 50% to 75% of its length between its two ends.

The transverse arm can also comprise means for securing on the connection module which are positioned at the end of the transverse arm opposite that where the retention unit is arranged, such that the machine tool has an assembly configuration in which the tool is supported by the transverse arm between the longitudinal rail and the retention unit.

The retention unit can comprise a displacement system which is suitable for climbing on the part, parallel to the longitudinal rail.

The machine tool can also comprise a control device, which is arranged so as to synchronise the movement of the retention unit with the movement of the connection module along the longitudinal rail.

The transverse arm is formed by a rectangular frame comprising two transverse uprights and two longitudinal uprights.

The connection between the tool and the transverse arm can comprise a pivot which permits regulation of the orientation of the tool along a longitudinal axis which is substantially parallel to the longitudinal rail.

The regulation of the orientation of the tool along a longitudinal axis can be carried out over a clearance with an angle of between 20° and 40°, and preferably over a clearance with an angle of approximately 30°.

The connection between the tool and the transverse arm can comprise a pivot which permits regulation of the orientation of the tool along a transverse axis which is substantially parallel to the transverse arm.

The regulation of the orientation of the tool along a transverse axis can be carried out over a clearance with an angle of between 5° and 20°, and preferably over a clearance with an angle of approximately 10°.

The connection between the tool and the transverse arm can comprise a slide which permits regulation of the tool along an axis which is substantially orthogonal to the longitudinal and transverse directions.

The tool can comprise a nose which is fitted so as to pivot, and means for measurement and correction of its orthogonality relative to the part.

The machine tool can also comprise an optical system comprising a camera and permitting visualisation and analysis of an area opposite the tool.

The machine tool can comprise a device selected from amongst: a sensor for the force on the transverse arm, a sensor for the force exerted on the longitudinal rail, an angular sensor which is configured to determine the angle between the transverse arm and the longitudinal rail, at least two linear sensors positioned on the connection module, at least two linear sensors positioned on the transverse arm.

The retention unit and/or the connection module can also comprise a device for detection of presence oriented in a displacement direction, and configured to detect an obstacle during a displacement of this type. The presence detection device is for example a laser device.

The machine tool can comprise a plurality of controllers, each controller being dedicated to the respective control of the functions of an element of the machine tool to which the said controller is connected.

The machine tool can for example comprise:
a first controller connected to the transverse arm;
a second controller connected to the tool support;
a third controller connected to the tool.

BRIEF DESCRIPTION OF THE FIGURES

Other particular features and advantages of the invention will also become apparent in the following description.

In the appended drawings, provided by way of non-limiting example.

DETAILED DESCRIPTION OF THE INVENTION

Figure 1:
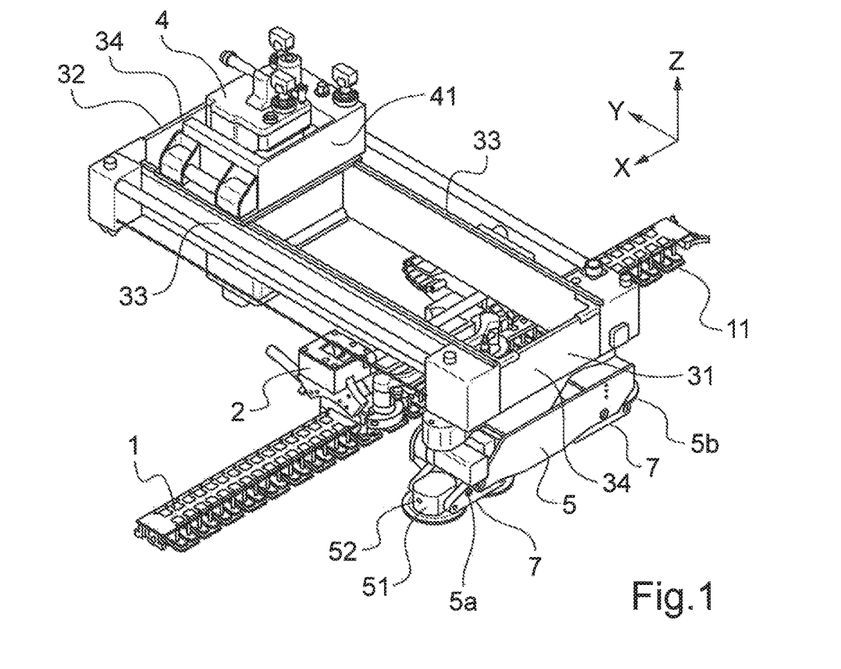
FIG. 1 shows, according to a three-dimensional schematic view, a machine tool according to an embodiment of the invention, in a first assembly configuration.

A machine tool according to the invention comprises a longitudinal rail 1, as represented in FIG. 1. In one embodiment of the invention, the longitudinal rail 1 comprises securing suckers 11 which make it possible to ensure the securing thereof on a part P on which machining operations for example are to be carried out. In this case, the longitudinal rail 1 is flexible, and can thus follow the curvature of the part P. A connection module 2 is fitted on the longitudinal rail 1, and can be displaced in translation on the latter. The connection module 2 ensures the connection between the longitudinal rail 1 and a transverse arm 3. The connection module 2 can be equipped with a set of rollers clamped onto the rail. In addition, the module 2 is advantageously equipped with at least one motor which gives rise to its translation on the longitudinal rail 1.

A transverse arm 3 is secured on the connection module 2. For this purpose, the transverse arm comprises means for securing on the connection module 2.

The transverse arm 3 can have the general form of a beam. In the exemplary embodiment illustrated, the transverse arm is in the form of a substantially rectangular frame. The transverse arm comprises two ends, i.e. a first end 31 and a second end 32. When the arm is formed by a rectangular frame, it comprises two transverse uprights 33 and two longitudinal uprights 34.

The transverse arm 3 is, and continues to be, substantially orthogonal to the longitudinal rail 1. The transverse arm 3 can be displaced in translation along the longitudinal rail 1, via the translation of the connection module 2. In the example represented here, this translation is associated directly with the translation of the connection module 2 along the longitudinal rail 1.

A tool 4, typically a machining tool, is connected to the transverse arm 3. In practice, the tool 4 can be fitted in a tool support 41, such as a multifunctional platform, which is connected to the transverse arm 3 via an interface, this module containing at least one work tool (which can be for example a machining tool, a means for measurement, a tool for depositing a coating). The tool support 41 can also comprise other functions, such as control of the positioning, in order to determine the position of the work tool, or linear or rotary encoders upstream from the final tool.

Two systems for control of the position are used jointly. In fact, a first system is responsible for controlling the position of the connection module 2 on the longitudinal rail 1.

A second system controls the positioning of the tool 4 on the transverse arm, i.e. on the surface of the part P on which operations are carried out. This system can use inertial sensors.

A third system controls the orientation of the tool 4 on the work surface, i.e. on the surface of the part P on which operations are carried out.

The first, second and third systems can implement a set of position sensors, of the linear and/or rotary sensor type. According to a variant, the third system can use inertial sensors.

The tool support 41 which contains the work tool is thus used to ensure the mechanical connection of the tool 4 to the transverse arm 3, to provide the energy necessary for operation of the work tool, and to ensure the functionality thereof by means of various peripherals such as jacks, sensors, etc. The tool support 41 can also ensure the control of the orthogonality of the transverse arm 3 by means of a system consisting of position sensors of the PSD (Position Sensitive Device) type. More specifically, the PSD system is a set of sensors configured to measure the torsion which is exerted on the arm 3 when the displacement of the module 5 is not synchronised with that of the module 2. These sensors can be force sensors which are configured to measure torsion, but also position sensors installed either at the level of the frame 3, between the module 5 and the module 2, or at the level of the points of securing of the module 2.

The measurement can be based on the fact that, when the orthogonality of the frame 3 is "perfect", the different sensors are all aligned, whereas when the retention unit 5 is offset relative to the module 2, the sensors are no longer aligned. Thus, the PSD system measures the position of the retention unit 5 relative to the module 2.

In the example represented here, the tool support 41 (and thus ultimately the tool 4) is designed to be displaced in translation along the transverse arm 3. The tool support 41 is thus in slide connection with the transverse arm 3.

In particular, in the exemplary embodiment represented, the tool 4 is supported by a tool support 41 positioned inside the frame which forms the transverse arm 3. The tool support 41 is mobile in translation between the transverse uprights 33. The tool support is thus fitted so as to slide on each of the transverse uprights 33. The translation of the tool support 41 along the transverse arm 3 can be motorised.

The tool 4 can in particular be a drill or a drilling tool known as an "automatic drilling unit". By way of example, and non-exhaustively, it can also be a tool for cutting, grinding, dimensional checking, non-destructive checking for example by means of ultrasound, detection of blind holes, application of mastic, application of adhesive, application of paint.

The motors which drive the movement of the module 2 along the longitudinal rail and/or that of the tool 4 (via the movement of the tool support 41) along the transverse arm 3 can be of the "step-by-step" type. They are advantageously associated with an electronic control system (not represented) making it possible to ensure the position control of the module.

Thus, the position of the tool can be very precisely controlled in an orthogonal reference system with an axis parallel to the longitudinal rail (so-called position at "x"), and an axis parallel to the transverse arm (so-called position at "y"). "x" and "y" refer to the orthogonal reference system x, y, z represented in FIG. 1.

Any other device also known in the prior art which makes it possible to steer and control the position of the tool according to these two axes can also be used.

The machine tool comprises a retention unit 5. The retention unit 5 is secured on an end of the transverse arm 3, in this case on the first end 31 of the transverse arm 3.

Figure 2:
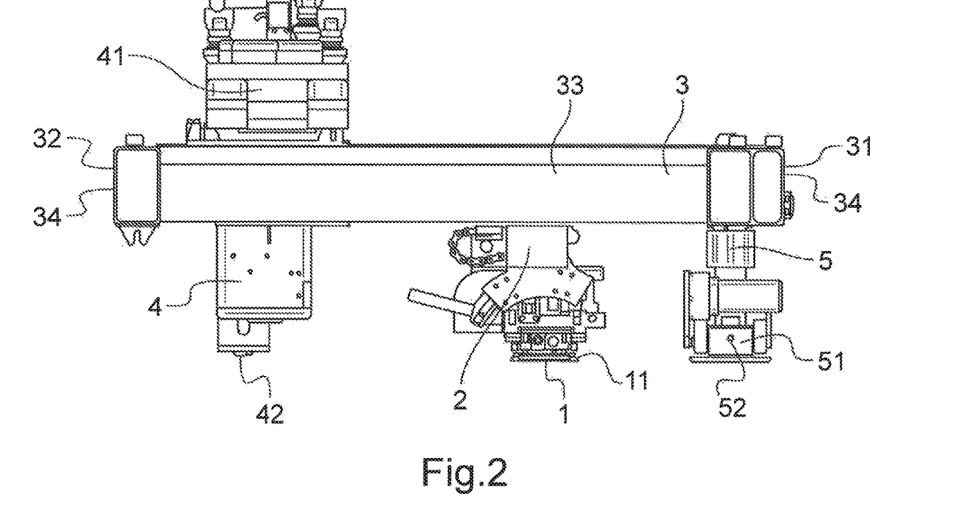
FIG. 2 shows the machine tool in FIG. 1, according to a profile view.
Figure 3:
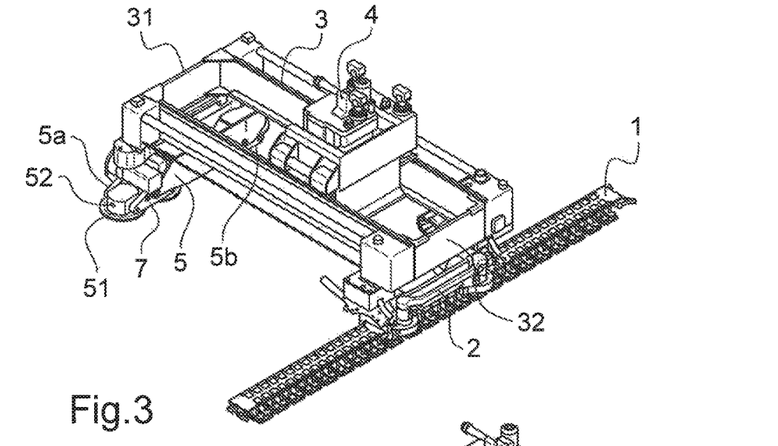
FIG. 3 shows, according to a three-dimensional schematic view, a machine tool according to an embodiment of the invention, in a second assembly configuration.

In particular, the machine tool can be fitted according to two configurations represented respectively in FIG. 1 and FIG. 3. In a first configuration shown in FIG. 1, the tool 4 and its tool support 41 are fitted cantilevered relative to the longitudinal rail 1. In this assembly configuration, the retention unit 5 is positioned on one side of the longitudinal rail 1, whereas the tool 4 is positioned on the other side of the longitudinal rail. Thus, the part of the transverse arm 3 which supports the tool 4, and the tool 4 itself, are fitted cantilevered relative to the longitudinal rail 1, as can be seen clearly in particular in FIG. 2.

In the second configuration, shown in FIG. 3, the tool 4 and its support 41 are fitted supported between the longitudinal rail 1 and the retention unit 5. In this more conventional configuration, the tool 4 and its tool support 41 are positioned between the longitudinal rail 1 and the retention unit 5.

For fitting in one or the other of the configurations of the machine tool, the transverse arm 3 is provided with different securing means which allow it to be secured on the connection module 2.

Thus, the transverse arm 3 comprises means for securing on the connection module 2, positioned between the two ends 31, 32 of the transverse arm. These securing means permit assembly of the elements which constitute the machine tool (represented in FIG. 3) according to the first assembly configuration represented in FIGS. 1 and 2.

In this configuration, in an aeronautical application, the transverse arm can have a cantilevered length which permits machining operations over approximately 550 mm (in the direction y).

The cantilevered length of the arm 3 can in particular correspond to 50% to 75% of its total length, measured between the first end 31 and the second end 32.

FIG. 3 illustrates the second assembly configuration permitted by the exemplary embodiment of the invention represented. In this configuration, the retention unit 5 is secured on one end of the transverse arm 3 (in this case the first end 31), whereas the connection module 2 is secured on the other end of the transverse arm 3 (i.e. in this case on the second end 32). The transverse arm 3, and therefore the tool 4 which it supports, are thus supported both on the longitudinal rail (via the connection module 2) and on the retention unit 5. In this assembly configuration, the machine tool has a configuration similar to that of the machine tool described in document FR3011494.

In general (and whether the machine tool concerned can or cannot have the assembly configuration in which the transverse arm 3 does not have a cantilevered part), the retention unit 5 can comprise one or a plurality of elementary retention units. The retention unit comprises one sucker 51 (or a plurality of suckers), permitting the retention in position of the retention unit 5 relative to a part P on which the machine tool carries out operations. The retention unit 5 is advantageously motorised, and more particularly comprises a displacement system in order to climb on the part P parallel to the longitudinal rail.

The retention unit can comprise a presence detection device. By way of example, the presence detection device comprises a laser 52. The presence detection device makes it possible to detect an obstacle in a direction of displacement of the retention unit 5. When an obstacle is detected in the vicinity (by cut-off of the laser beam, for example), the displacement of the retention unit 5, and consequently of the connection module 2, is stopped.

Similarly, the connection module 2 can comprise a presence detection device, comprising a laser for example. This device detects whether an obstacle is present in the vicinity on the longitudinal rail 1. When an obstacle is detected in the vicinity (by cut-off of the laser beam, for example), the displacement of the connection module 2, and consequently of the retention unit 5, is immediately stopped.

In the example represented here, the retention unit 5 comprises two elementary units 5a, 5b, which are secured on the transverse arm 3, each by a connection element 7. Each elementary unit 5a, 5b comprises at least one sucker 51, which is supplied by a device for generation of vacuum.

The sucker(s) 51 permit(s) the retention in position of the retention unit 5 relative to the part P, during an operation on the part P which can generate forces in the transverse arm 3.

Each elementary unit 5a, 5b is articulated relative to the transverse arm according to a pivot of axis substantially parallel to the said transverse arm (i.e. in the direction y). This allows the elementary units 5a, 5b to be perfectly in contact with the part P, even if the said part P has a pronounced radius of curvature in the direction of the longitudinal rail.

Figure 4:
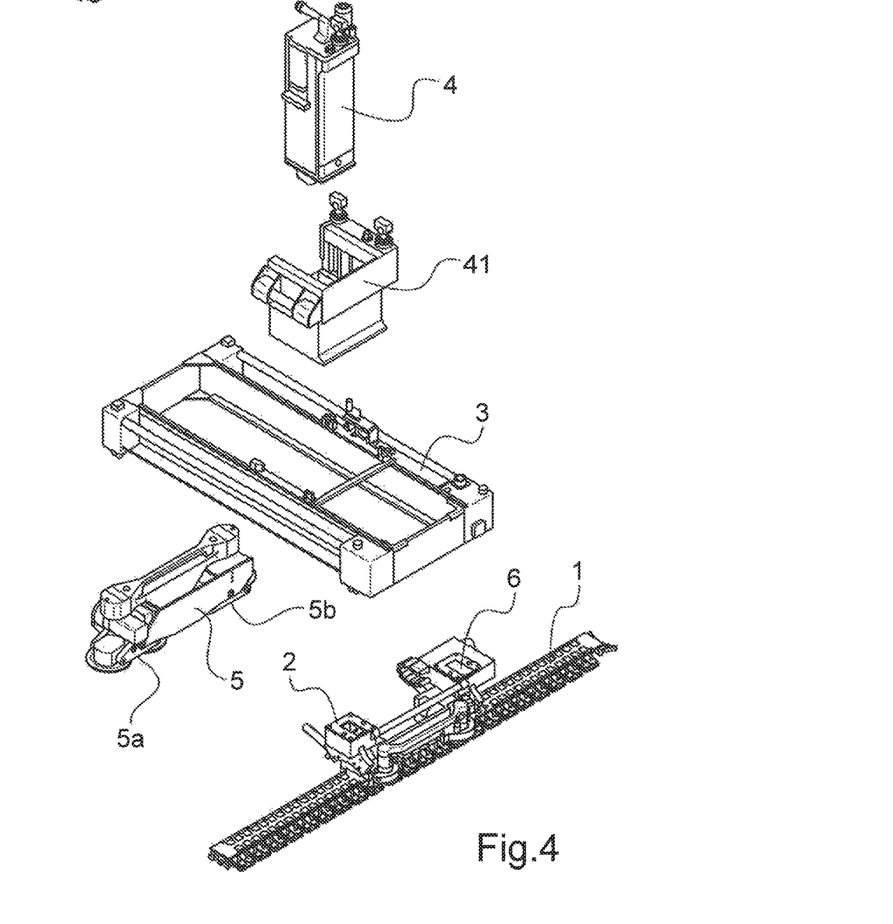
FIG. 4 shows schematically, according to an exploded view, the main elements which constitute the machine tool in FIGS. 1 to 3.
Figure 5:
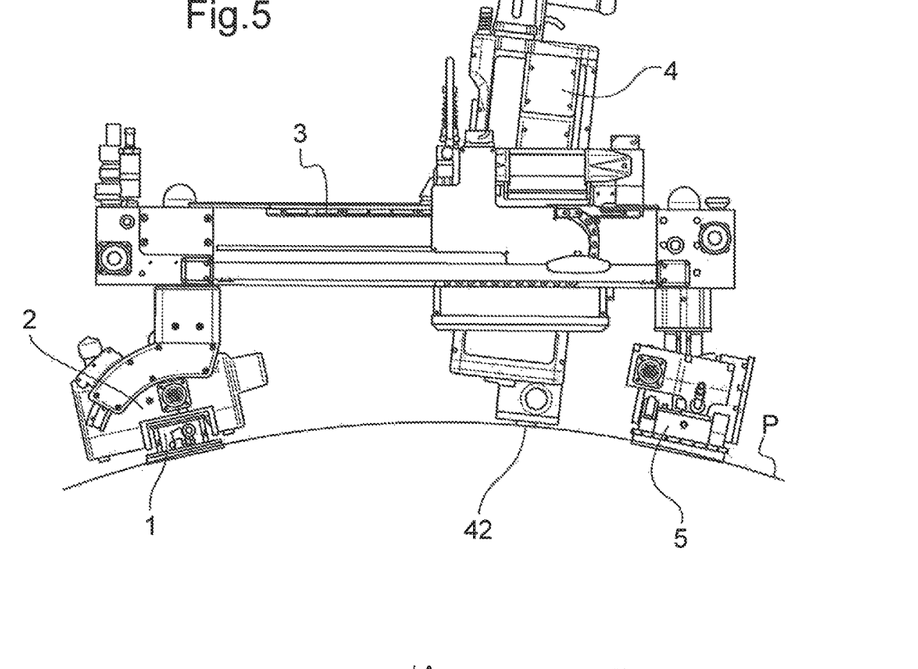
FIG. 5 shows, according to a profile view, a machine tool in the assembly configuration in FIG. 3, installed on a highly curved surface, in order to carry out operations on it.

In addition, as shown in FIG. 4, the retention unit 5 is advantageously articulated so as to pivot relative to the transverse arm according to an axis parallel to the longitudinal rail (i.e. in the direction x). This allows the retention unit 5 to be perfectly in contact with the part P, even if the said part P has a pronounced radius of curvature in the direction of the transverse arm, as represented in FIG. 4.

Similarly, the connection module 2 is advantageously articulated so as to pivot relative to the transverse arm according to an axis parallel to the longitudinal rail (i.e. in the direction x). This makes it possible to adapt the connection between the longitudinal rail 1 and the transverse arm 3, even if the said part P has a pronounced radius of curvature in the direction of the transverse arm, as represented in FIG. 4.

Although they are represented in FIG. 4 in the optional assembly configuration in which the transverse arm 3 does not have a cantilevered part, all the aforementioned characteristics permitting adaptation of the machine tool to a curved surface or having two radii of curvature are applicable to the machine tool in its assembly configuration in which the retention unit 5 and the tool 4 are situated on both sides of the longitudinal rail 1.

The movement of the retention unit 5 is advantageously controlled by a control device 6. The control device 6 can be connected to the retention unit 5. According to different variants, the control device 6 can have various locations and characteristics. As an alternative to a position connected to the retention unit 5, the control device 6 can be supported by the connection module 2, or by any other element of the machine tool. It can be on the exterior of the machine tool. Within the context of a so-called centralised control architecture (or an architecture which is partly centralised), the control device 6 can also use the same physical means (computers, etc.) as the means which control the displacement of the module 2 on the longitudinal rail 1. Finally, the control data obtained from the control device 6 can be transmitted to the retention unit 5 by wired or wireless means.

The control device 6 is intended to synchronise the movement of the retention unit 5 with that of the module 2 along the longitudinal rail 1.

On a flat surface, the movement of the retention unit 5 must be identical at all times to that of the connection module 2 along the longitudinal rail 1, in order to ensure identical and simultaneous displacement of these elements, thus maintaining at all times the orthogonality of the transverse arm 3 relative to the longitudinal rail 1. On the other hand, during use of the machine tool on a surface with a double curvature, for example at the front of the fuselage of an aircraft, the speed of the retention unit 5 must be different from the speed of the module 2, in order to ensure that the retention unit 5 and the module 2 are displaced in a synchronised manner (and to maintain at all times the orthogonality of the transverse arm 3 relative to the longitudinal rail 1), although the distances to be travelled respectively by the retention unit 5 and the connection module 2 are different. The control device 6 permits control of this type of the displacements of the retention unit 5 and the connection module 2.

The machine tool can also be provided with means for determination of the forces generated by the transverse arm at its connection with the longitudinal rail in association with the control device 6. These means can typically be sensors or strain gauges which permit determination of the torque in the connection between the longitudinal rail 1 and the transverse arm 3.

The means for determination of the forces are functionally connected to the control device 6. The control device 6 thus receives the measurements from the sensors, and, according to these measurements, commands a movement of the retention unit 5, by means of its motorisation, such as to minimise the forces generated by the transverse arm at its connection with the longitudinal rail.

In general, the machine tool can comprise a set of geometric checking means (not illustrated) which make it possible to identify the deformations (flexions, torsions) which can affect the precision of the positioning of the tool 4, and to correct this positioning by means of a correction loop.

In particular, the checking of the displacement of the retention unit 5, and thus of the first end 31 of the transverse arm 3, can implement various alternative or complementary devices. For example, a rotation sensor can be positioned on any rotating part of a system for displacement of the retention unit 5, i.e. a small wheel, caterpillar pulley, pinion, motor shaft, etc. A force sensor can be arranged on the transverse arm 3, jointly with another force sensor positioned on the longitudinal rail, thus making it possible to determine the difference in force measured between these two sensors. An angular position sensor can be positioned at the connection between the transverse arm 3 and the longitudinal rail 1, in order to measure the angle formed between the longitudinal rail 1 and the transverse arm 3, and if applicable the difference in angle relative to the theoretical 90° between the longitudinal rail 1 and the transverse arm 3.

In general, the sensor(s) implemented is/are connected to a computer, thus making it possible to compare one or a plurality of values measured to a predefined threshold, in order if applicable to apply a correction to the control of the system for displacement of the retention unit 5 or of the connection module 2.

In all the embodiments of the retention unit 5, it can be advantageous to vary the force generated by the suckers. Thus, it can be advantageous to vary the low pressure in the suckers. For example, when the part on which operations are carried out can be assimilated to a horizontal cylinder, as an aircraft fuselage can be, the gravity force which is exerted on the retention unit 5 tends to space it from the part when an operation is carried out in the low part of the latter, whereas it tends to place it on the part when an operation is carried out in the high part of the latter. Typically, the retention unit 5 can comprise an accelerometer and/or inertial sensors which are configured to permit determination of its position and/or its orientation, in order to guarantee homogeneous performance of the machine tool irrespective of its orientation.

The exemplary embodiment of the machine tool represented here comprises a tool 4 connected to the transverse arm 3 via a tool support 41 which is designed to be displaced in translation along the transverse arm 3. According to various variants of the invention, the tool can also have its orientation regulated or also controlled according to three orthogonal axes of rotation, or according to one, or two, of these three axes.

Figures 6A, 6B, 6C:
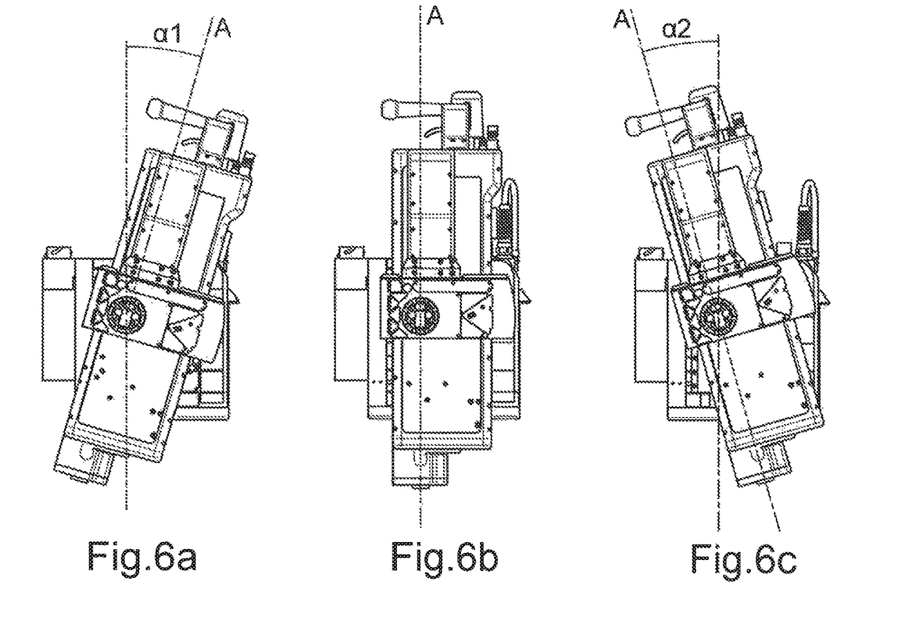
FIGS. 6a, 6b and 6c illustrate a first capacity for regulation in rotation of the position of the tool of the machine tool in FIGS. 1 to 5.

FIGS. 6a to 6c illustrate three positions of regulation of the orientation of the tool 4 according to a substantially longitudinal axis of rotation (i.e. in the direction x). In this case, the positions which are represented respectively in FIGS. 6a and 6c correspond to two extreme regulation positions "abutting" the tool 4, around a median position represented in FIG. 6b. In the median position represented in FIG. 6b, the tool has a main axis A (for example corresponding to the direction of drilling, if the tool 4 is or has a drill) oriented according to the axis z. In the extreme position in FIG. 6a, the tool is inclined (i.e. its main axis A is inclined) in a first direction by an angle α1 of 15° relative to the direction z (or, in other words, relative to the median position in FIG. 6b). In the extreme position in FIG. 6c, the tool is inclined (i.e. its main axis A is inclined) in a second direction opposite the first direction by an angle α2 of 15° relative to the direction z (or, in other words, relative to the median position in FIG. 6b). Thus, in the example represented, the tool 4 has a regulation clearance of 15° more or less relative to the median position, i.e. a clearance of 30°. Other values can be envisaged, and provide the tool with more or less polyvalence. For example, the tool can be regulated over a clearance of between 20° and 40°, centred or not centred on the median position.

Figure 7A:
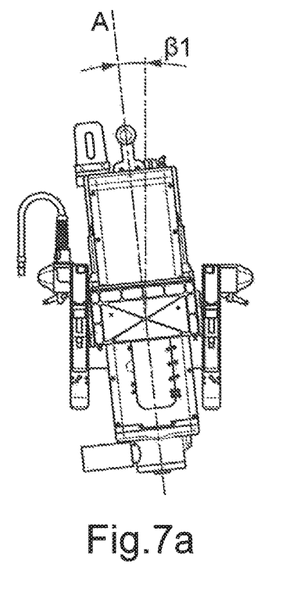
FIGS. 7a, 7b and 7c illustrate a second capacity for regulation in rotation of the position of the tool of the machine tool in FIGS. 1 to 5.
Figure 7B:
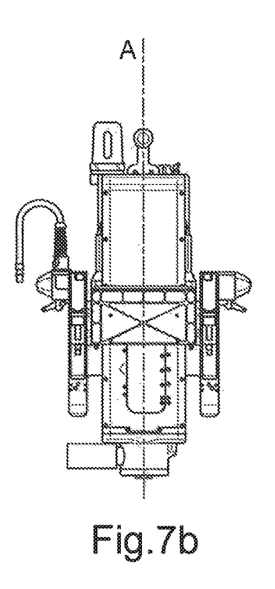
Figure 7C:
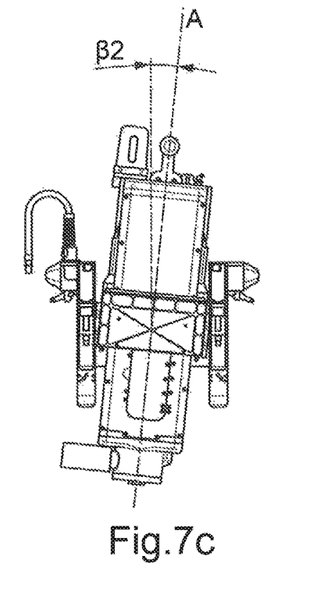

FIGS. 7a to 7c illustrate three positions of regulation of the orientation of the tool 4 according to a substantially transverse axis of rotation (i.e. in the direction y). In this case, the positions represented respectively in FIGS. 7a and 7c correspond to two extreme regulation positions "abutting" the tool 4, around a median position represented in FIG. 7b. In the median position represented in FIG. 7b, the tool has a main axis A (for example corresponding to the direction of drilling, if the tool 4 is or has a drill) oriented according to the axis z. In the extreme position in FIG. 7a, the tool is inclined (i.e. its main axis A is inclined) in a first direction by an angle β1 of 5° relative to the direction z (or, in other words, relative to the median position in FIG. 7b). In the extreme position in FIG. 7c, the tool is inclined (i.e. its main axis A is inclined) in a second direction opposite the first direction by an angle β2 of 5° relative to the direction z (or, in other words, relative to the median position in FIG. 7b). Thus, in the example represented, the tool 4 has a regulation clearance of 5° more or less relative to the median position, i.e. a clearance of 10°. Other values can be envisaged, and provide the tool with more or less polyvalence. For example, the tool can be regulated over a clearance of between 5° and 20°, centred or not centred on the median position.

The position of the tool can also be regulated according to the third axis, i.e. in translation in the direction z. For this purpose, the tool or its support comprises a slide connection along this axis.

The three above-described regulations permit positioning of the tool, if applicable, orthogonally to the surface of the part P which can have complex curvature, as well as bringing of a nose 42 of the tool 4 into the vicinity of, or in contact with, the surface of the part P, as illustrated in FIG. 4. In particular the nose 42 can pivot (it can be fitted as a pivot), which makes it possible to control its normality (i.e. its orthogonal nature) relative to the part P.

Figure 9:
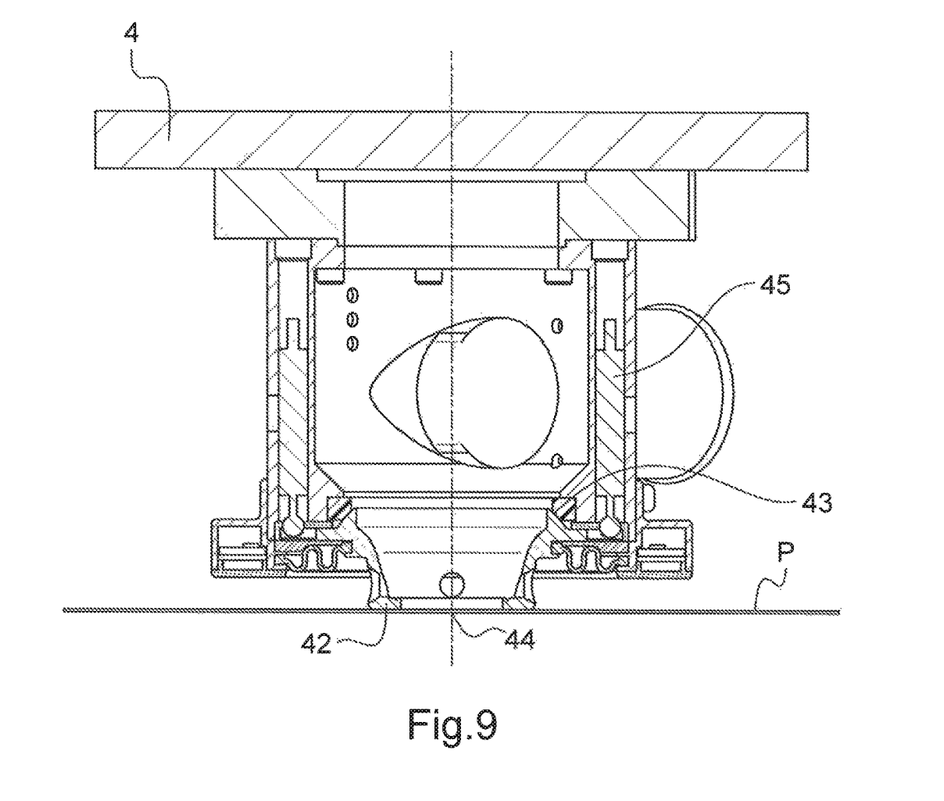
FIG. 9 represents schematically, according to a view in cross section, the nose of a tool 4 which can be used in the invention.

More particularly, a system controls (i.e. measures and corrects) the orthogonality of the tool 4 relative to its work surface (on the face of the part P). The system, illustrated in FIG. 9, is composed of an assembly fitted in the form of a pivot pivoting at the pivot surface 43 around the point of pivoting 44. The assembly is arranged at the nose 42, and is coupled to a set of position sensors 45. With the nose of the tool in contact on the surface, the position differential is measured, and the orientation of the tool is determined relative to the work surface. The orientation of the tool can thus be regulated by control in a loop between the measurement of the position and the control of the movements of the tool (until the differential between the measurement of the position sensors 45 is zero, which corresponds to perfect orthogonality of the tool 4 relative to the surface of the part P).

Figure 8A:
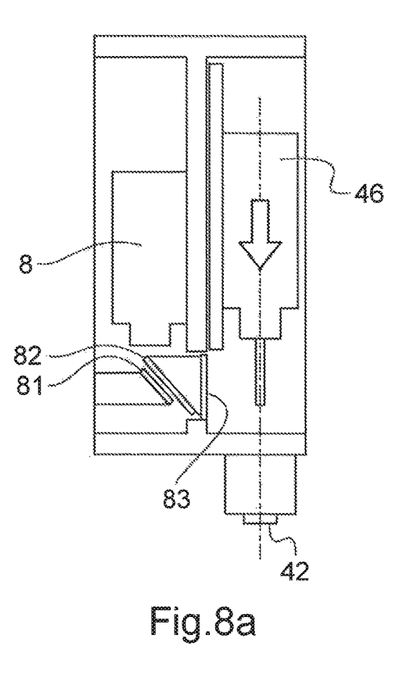
FIGS. 8a and 8b illustrate an optical system which can be implemented in an embodiment of the invention.
Figure 8B:
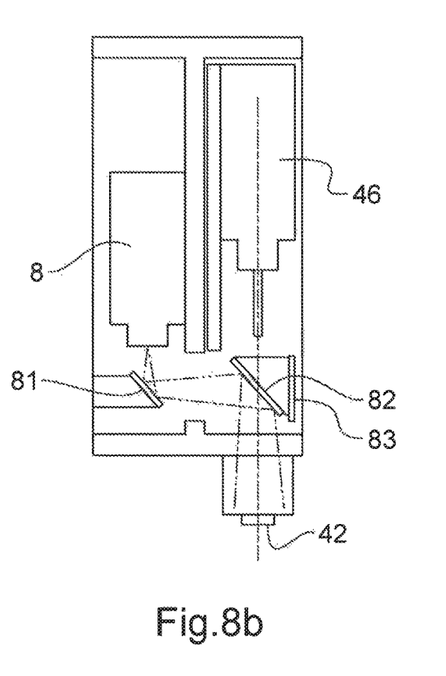

FIGS. 8a and 8b illustrate an optical system which can be implemented in an embodiment of the invention. The optical system makes it possible to visualise and analyse an area opposite the tool in which an operation must be carried out. This may permit very precise positioning of the tool, for example relative to a drilling point of reference, or also to carry out a predefined drilling pattern precisely.

The optical system comprises a camera 8, a first mirror 81 and a second mirror 82. The second mirror 82 is mobile, between a position in which the optical system is inactive (FIG. 8a), and a position in which the optical system is operating (FIG. 8b). In the embodiment represented, the tool 4 can be used only when the optical system is inactive, and conversely the optical system can be active only if the tool is not being used. In fact, in the active position in FIG. 8b, the second mirror 82 is positioned in the machining axis, in this case a drill 46, which is in the retracted position (raised into the tool module). In the example represented, the camera 8 has an axis of vision parallel to the axis of drilling of the drill 46. In the active position of the optical system, the first mirror and the second mirror are positioned so as to form a periscope, so as to provide the camera with an axis of vision which is combined with the axis of the drill 46, thus permitting visualisation through the nose 42.

In the inactive position represented in FIG. 8a, the second mirror is retracted away from the axis of the drill 46 and the nose 42. A partition 83 isolates the optical system from the tool 4 and from any chips or dust which may rise into the tool 4 during the machining.

As previously stated, the control of the machine tool implements numerous steering or control systems, i.e. positioning of the machine tool, and in particular of the connection module 2, on the longitudinal rail, orthogonality of the transverse arm 3 relative to the longitudinal rail 1, positioning of the tool support 41 on the transverse arm 3, positioning and orientation of the tool 4 relative to the part P, and of the tool 4 itself, and other functions (optical visualisation system, anti-collision laser, etc.).

Figure 10:
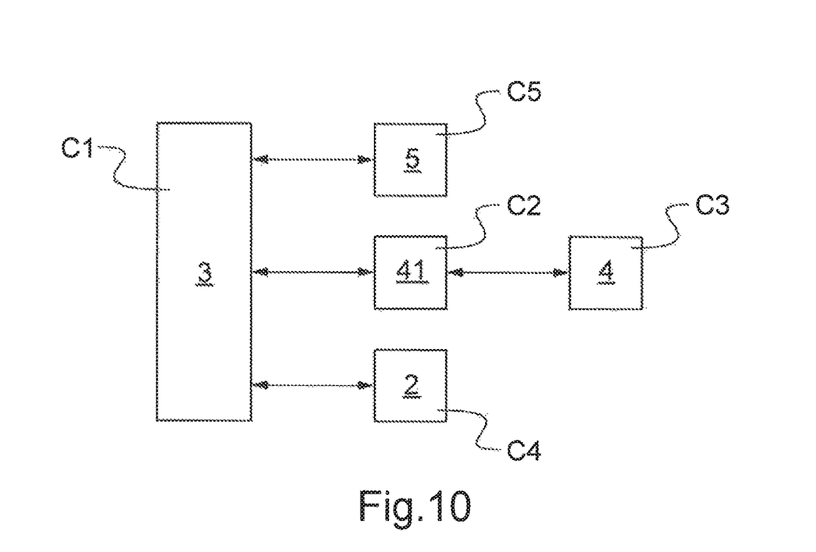
FIG. 10 represents schematically an example of distributed architecture for the control of a machine tool according to an embodiment of the invention.

All these functions can be controlled by one or a plurality of computers or controllers (as previously described for a centralised architecture which implements the control device 6). Advantageously, a distributed control architecture can also be used. FIG. 10 illustrates this aspect. Thus, FIG. 10 illustrates an example of distributed control architecture which can be implemented in the invention.

In the example represented, each element controls functions which are allocated to it via one or a plurality of dedicated computers. Each element is also in logic interface (i.e. it can exchange information) with the other elements which are relevant for the function in question, or which need information concerning this function for the control of other functions. For example, the position of the tool on the part depends (in particular) on the position of the connection module 2 on the longitudinal rail 1 and of the tool support 41 on the transverse arm 3, such that information destined for the tool can be addressed by a computer which controls the tool and by computers which control respectively the connection module 2 and the tool support 41.

In the example represented, the transverse arm 3 comprises a first controller C1. The first controller C1 comprises the functions of electrical supply to the other controllers described hereinafter. The first controller C1 carries out the measurement of the orthogonality of the transverse arm 3, and its control via the generation of commands destined for the connection module 2 and/or the retention unit 5. It can generally act as a centraliser and redistributor of the data obtained from, and destined for, other control modules.

A second controller C2 is supported by the tool support 41. The second controller C2 determines and controls the position of the tool-holder 41 along the transverse arm 3, as well as the orientation of the tool 4 relative to the work surface of the part P.

A third controller C3 is connected to the tool 4. The third controller C3 determines and controls the position and orientation of the tool 4. It can also control other functions in relation with the tool, for example implementation of the camera 8.

A fourth controller C4 is supported by the connection module 2. The fourth controller C4 is responsible for controlling (determining and steering) the movement of the connection module 2 along the longitudinal rail 1. If applicable, it can acquire the data obtained from a presence detection device supported by the connection module 2, in order to prevent any collision with an obstacle on the longitudinal rail 1.

A fifth controller C5 is supported by the retention unit 5. The fifth controller C5 controls the movement of the retention unit 5 on the surface of the part P. If applicable, it also controls the distribution and level of low pressure in the suckers 51 of the retention means 5.

It will be appreciated that the above-detailed distribution is only a possible exemplary embodiment. Numerous other distributions of the functions between controllers can be envisaged, and also certain controllers can be common to a plurality of elements of the machine tool. For example, the first controller C1 can be configured to carry out the functions associated with the fourth controller C4 and the fifth controller C5.

A distributed control architecture is particularly relevant in a modular approach to the machine tool such as the one shown in FIG. 4. In fact, by distributing the functions in a plurality of controllers which are associated respectively with each module or group of modules, the maintenance of the machine tool is facilitated (it is possible to dismantle and replace a module or a controller), the machine tool can be developed technically or updated more easily (by replacing a single module in order to improve the functions of this module or to add new functions). It will be appreciated that other embodiments or variants of the machine tool can be envisaged without departing from the context of the invention.

In particular, other means for securing the longitudinal rail 1 to the part P can be used, for example magnetic means.

In another variant of the invention, the longitudinal rail 1 does not comprise means for securing directly on the part to be machined. In this variant, the longitudinal rail 1 is not placed on the part P or in contact with the latter, but forms part of a nearby installation or "workstation". The longitudinal rail 1 is then positioned fixed relative to the part, by immobilisation of the part P in relation to the workstation.

The machine tool thus developed makes it possible to carry out automated or semi-automated operations, in particular simple machining operations, on the surface of a part with large dimensions which can be curved, such as, for example, an aircraft fuselage element. With a single rail needing to be positioned as a longitudinal reference on the part, the machine tool developed can be adapted, according to the embodiment concerned, to structures which have a double curvature. It is also easy to install, such that, typically, a single operator can be sufficient for its implementation.

Thanks to the assembly of a tool in a cantilevered form, operations can be carried out in areas which are difficult to access or have a form which makes it complicated to carry out operations. According to certain embodiments, the machine tool has a plurality of assembly configurations, i.e. in addition to the assembly configuration with a tool cantilevered, it has a configuration in which the tool is supported between the rail and a retention unit.

The machine tool developed can also easily be reconfigured, and can receive numerous types of tool which make possible numerous types of machining operations, assemblies, or controls.

The invention claimed is:

1. A machine tool for carrying out operations on a part, the machine tool comprising:
    a longitudinal rail configured to be positioned relative to the part;
    a transverse arm orthogonal to the longitudinal rail, the transverse arm comprising two ends;
    a module for connection between the transverse arm and the longitudinal rail, the connection module being fitted in translation on the longitudinal rail;
    a tool supported by the transverse arm;
    at least one retention unit arranged at one end of the transverse arm, and comprising at least one sucker permitting retention in position of the retention unit on the part,
    wherein the transverse arm comprises means for securing on the connection module, positioned between the two ends of the transverse arm, such that the machine tool has an assembly configuration in which the retention unit and the tool are positioned respectively on both sides of the longitudinal rail, such that the tool is fitted cantilevered relative to the longitudinal rail, and
    wherein the transverse arm further comprises means for securing on the connection module, positioned at the end of the transverse arm opposite that where the retention unit is arranged, such that the machine tool has an assembly configuration in which the tool is supported by the transverse arm between the longitudinal rail and the retention unit.

2. The machine tool according to claim 1, wherein the retention unit comprises a displacement system configured for climbing on the part, parallel to the longitudinal rail.

3. The machine tool according to claim 2, further comprising a control device, arranged so as to synchronise the movement of the retention unit with the movement of the connection module along the longitudinal rail.

4. The machine tool according to claim 1, wherein the transverse arm is formed by a rectangular frame comprising two transverse uprights and two longitudinal uprights.

5. The machine tool according to claim 1, wherein the connection between the tool and the transverse arm comprises a pivot permitting regulation of the orientation of the tool along a longitudinal axis substantially parallel to the longitudinal rail.

6. The machine tool according to claim 1, wherein the connection between the tool and the transverse arm comprises a pivot permitting regulation of the orientation of the tool along a transverse axis substantially parallel to the transverse arm.

7. The machine tool according to claim 1, wherein the connection between the tool and the transverse arm comprises a slide permitting regulation of the tool along an axis substantially orthogonal to the longitudinal and transverse directions.

8. The machine tool according to claim 1, further comprising an optical system comprising a camera and permitting visualisation and analysis of an area opposite the tool.

9. The machine tool according to claim 1, comprising a device selected from amongst: a sensor for the force on the transverse arm, a sensor for the force exerted on the longitudinal rail, an angular sensor configured to determine the angle between the transverse arm and the longitudinal rail, at least two linear sensors positioned on the connection module, at least two linear sensors positioned on the transverse arm.

10. The machine tool according to claim 1, wherein at least one of the retention unit and the connection module further comprises a device for detection of presence oriented in a displacement direction, and configured to detect an obstacle during a displacement of this type.

11. The machine tool according to claim 1, comprising a plurality of controllers, each controller being dedicated to the respective control of the functions of an element or of a set of elements of the machine tool to which the controller is connected.

12. The machine tool according to claim 11, wherein the plurality of controllers comprising:
a first controller connected to the transverse arm;
a second controller connected to the tool support; and
a third controller connected to the tool.

* * * * *